Dec. 22, 1925. 1,566,612
E. V. LOUSTALOT
AUTOMOBILE BED
Filed Dec. 18, 1924 2 Sheets-Sheet 1
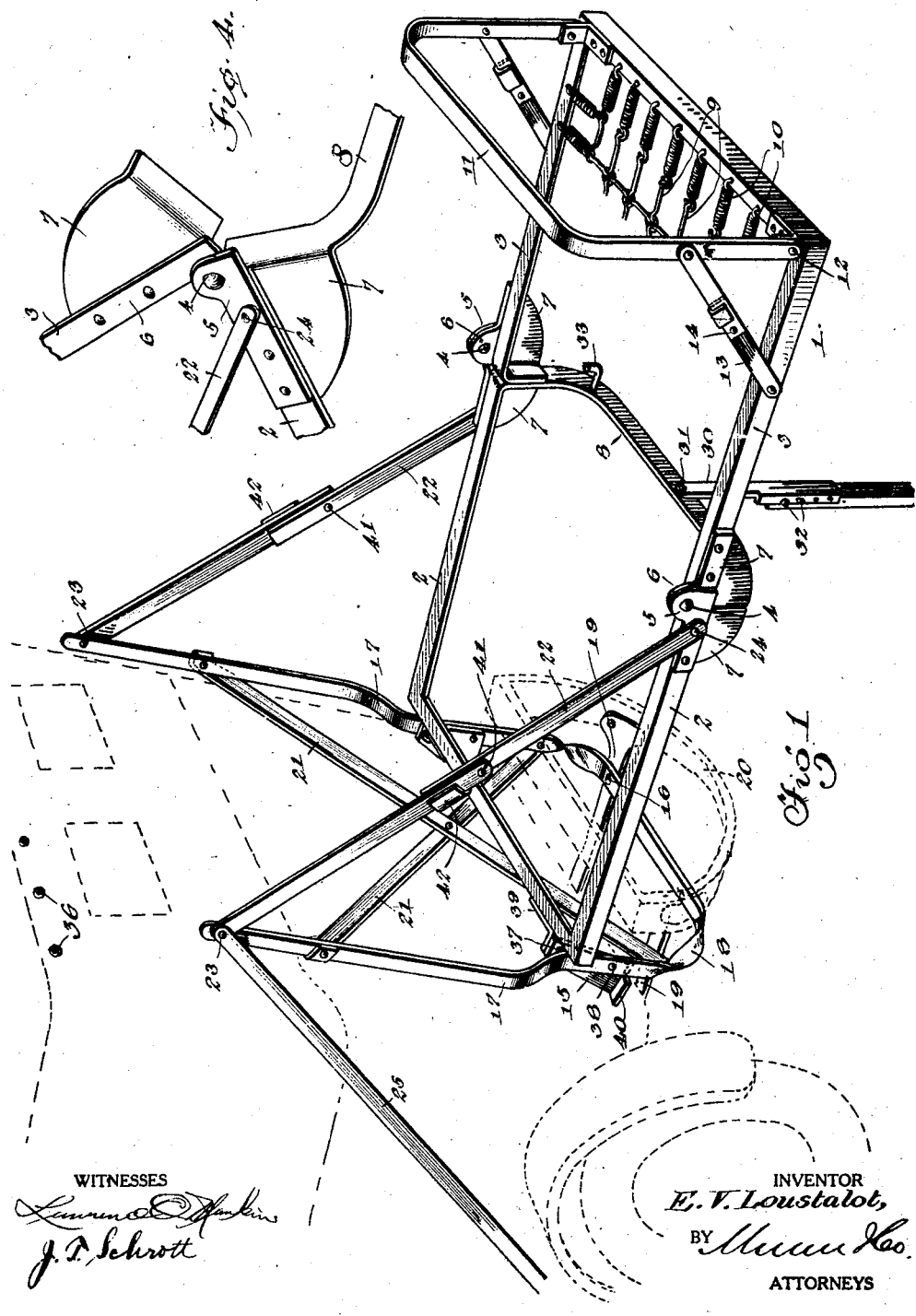

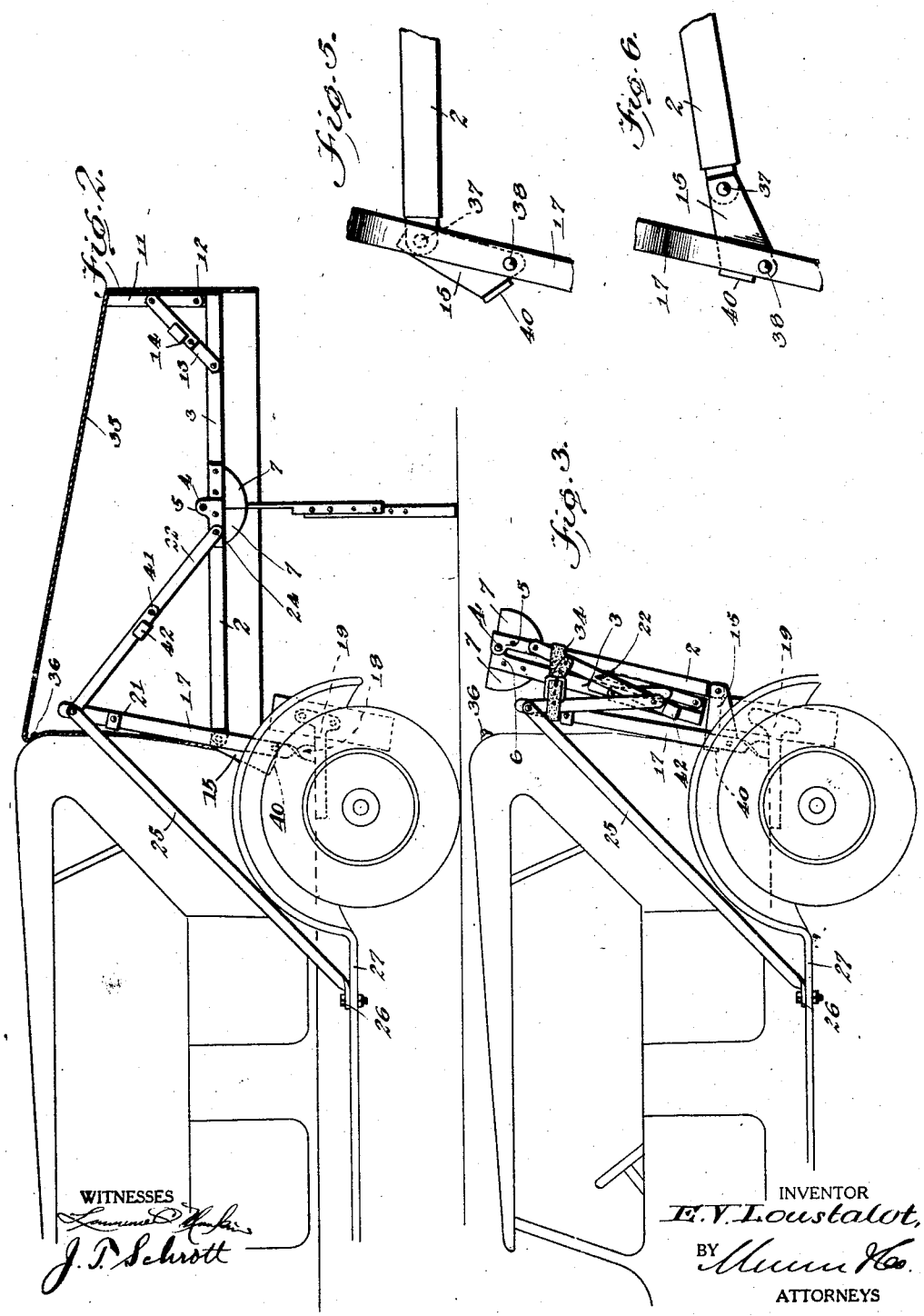

Patented Dec. 22, 1925.

1,566,612

UNITED STATES PATENT OFFICE.

EDWARD VINCENT LOUSTALOT, OF FRANKLIN, LOUISIANA.

AUTOMOBILE BED.

Application filed December 18, 1924. Serial No. 756,730.

*To all whom it may concern:*

Be it known that I, EDWARD V. LOUSTA-LOT, a citizen of the United States, and resident of Franklin, in the parish of St. Mary and State of Louisiana, have invented certain new and useful Improvements in Automobile Beds, of which the following is a specification.

This invention is an improvement in automobile beds and it consists of the constructions, combinations and arrangements herein described and claimed.

An object of the invention is to provide a bed of a foldable nature so that it is readily adapted for use upon automobiles and particularly for camping purposes.

Another object of the invention is to provide a foldable automobile bed which is attached directly upon the framework of the automobile and is capable of being folded up when not in use thereby to take up comparatively little room and not to appear particularly unsightly.

Other objects and advantages appear in the following specification, reference being had to the accompanying drawings, in which—

Figure 1 is a perspective view of the bed frame and illustrating the application thereof to the rear of an automobile.

Figure 2 is a side elevation showing the bed frame suspended, parts being shown in section.

Figure 3 is a side elevation showing the bed frame in the folded position.

Figure 4 is a detail perspective view of one of the bed frame hinges or pivots.

Figure 5 is a detail side elevation showing the position of the compound hinge when the bed is open.

Figure 6 is a similar view showing the position of the compound hinge prior to folding the bed frame.

This invention is an improvement in my Patent 1,421,268, beds for use on automobiles, granted June 27, 1922, one of the important features of the improvment being that the bed frame can be folded into what might be called a smaller compass to take up less room at the back of the automobile or other motor vehicle by which it is carried. Other improvements reside in the manner of supporting the bed frame. Although the parts are of light construction they are, nevertheless, sufficiently strong for all purposes.

In carrying out the invention, provision is made of a bed frame generally designated 1, consisting of a head section 2 and a foot section 3. These sections are pivoted together at 4, use being made of complementary hinge brackets 5 and 6. The frame sections have abuttable shoulders 7 which both act as a brace and as limiting means for the sections when extended as in Figures 1 and 2.

The head section 2 is a complete rectangular frame in that it includes the cross bar 8 (Fig. 1), while the foot section 3 has no such cross bar. The bed frame is made of angle iron, according to custom, providing both strength and lightness. A wire link mattress 9 is attached to the head and foot ends both at the sides and ends, by springs 10. The link mattress is readily foldable with the bed frame.

This mattress is intended to support any particular kind of bedding which the user intends to employ, and if it is not too heavy, it can be stored in the space between the folded bed frame parts and the rear of the automobile. The section 3 carries a foot frame 11, pivoted at 12, and provided with braces 13 for sustaining it in the upright position. In practice the foot frame provides a support for a suitable cover by which the bed may be enclosed. The braces are pivoted or "broken" at 14, one part of each brace having interengagement with the other part to limit the straightening movement of the brace.

Compound hinges 15 provide the mountings by which the bed frame 1 is attached permanently to the upright standard 17 of the U-frame 18. The hinges are pivoted at 37 and 38 to the respective bed and supporting frames. The bed frame has brackets 39 for the purpose. The hinges have lugs 40 to limit the extending movement of the bed frame. The hinges are moved up into the positions in Figures 1 and 5 when in use, but are extended as in Figures 3 and 6 upon desiring to hold the bed for storage.

The U-frame 18 is preferably secured permanently to a convenient part of the automobile frame, for example at 16 to the arms 19 which support the tire carrier 20. The frame may be temporarily secured to these arms, the mode of attachment being optional. Cross rods 21 brace the U-frame. These cross rods (or bars) rest against the body of the car. Braces 22, extending from the top of the standards 17 to the bed frame 1, assist in supporting the latter. These braces are pivoted at 41, the interengagement of one end of each brace with the companion brace being such as to limit the straightening movement of the braces. The arrangement at 42 permits "breaking" the braces downward so that folding (Fig. 3) may be accomplished.

Pivots 23 and 24 connect the respective ends of the braces to the uprights 17 and the head section 2 of said frame. The pivots 23 also mark the connection of bars 25 which extend forward and at 26 (Figs. 2 and 3) are secured to the running board 27 of the automobile. Obviously these bars may be connected elsewhere if deemed more expedient.

A telescopic leg 30 completes the support of the bed frame 1. One of the telescopic sections is pivoted at 31 to the cross bar 8. The other section is held in various adjusted positions by means of bolts 32 which can be screwed into any set of the various holes in each of the sections. The telescopic base may be swung up into the inoperative position, a hook 33 being provided for the purpose of then supporting the leg.

A strap 34, or the like, serves to secure the movable parts of the frame when collapsed as in Figure 3. This strap passes around the standards of the U-frame 18 and in front of the bed frame. A cover 35 (Fig. 2) provides a top for the bed. This cover may include side and end flaps so that there may be a completed closure of the bed when not in use. The upper end of the cover or top is suitably fastened to the top of the automobile by suitable means, for example snap fasteners 36, and the lower end of the top simply drapes over the foot frame 11 as shown in Figure 2.

The operation is readily understood from the foregoing description. The foot frame 7 and the head and foot sections 2 and 3 of the bed frame 1 are foldable upon themselves at the pivots 12 and 4. It is first necessary to "break" the pivotal joint 14 of the brace 13 before the foot frame 11 can be swung down upon the foot section 3. The foot section may then be swung over upon the head section 2. The hinge 5, 6 is of such a nature that room for the section 11 is provided when the two bed sections are closed.

The hinge plates 15 must be extended (Figs. 3 and 6) before the folded parts of the bed frame can be swung up into the closed position in Figure 3. The hinge plates actually provide support or brackets which furnish adequate rest for the folded bed. The braces 22 are also "broken" at the pivot 41 in collapsing the bed.

Upon desiring to use the bed the parts are moved in reverse order, that is to say, the head section 2 is swung down, the foot section 3 over and out and the foot frame 11 upward. The braces 13 and 22 swing to the full extent upon the foregoing opening movement.

Complete opening of the bed occurs when the hinge plates 15 are swung up into the position in Figure 5. There is a tendency to produce such swinging by merely bearing down on the free extremity of the bed frame. The swinging movement of the hinge plates ends when the adjacent cross parts of the head section 2 strikes the standards 17 of the U-frame 18. This not only limits the movement of the bed frame, as stated, but also provides a firm abutment, lending considerable rigidity to the bed frame. Reverting to the closing of the bed, the lugs 40 engage the back of the standards 17 and limit the outward movement of the hinge plates, as best shown in Figures 3 and 6.

Having opened the bed for use, the necessary bedding is placed upon the wire mattress 9, and the cover or top 35 fitted in place by means of the snap fasteners 36. The sides and end of the cover are simply permitted to drape down, furnishing an ample enclosure for the sleeper.

While the construction and arrangement of the improved automobile bed is that of a generally preferred form, obviously, modifications and changes may be made without departing from the spirit of the invention or the scope of the claims.

I claim:—

1. A bed of the character described comprising a frame consisting of a plurality of sections, hinges connecting the sections permitting folding the frame, a fixed support, and compound hinges connecting one of the sections with the support, said hinges comprising plates pivoted both to the section and to the support, and having lugs to engage the support to limit an extending movement of the hinges preparatory to folding the frame section next to the support.

2. A bed of the character described comprising a frame consisting of a plurality of sections, hinges connecting the sections permitting folding together, a support, and compound hinge plates connecting one section with the support and having limited movement in respect to both the support and bed frame permitting jamming of the bed frame against the support when extended for use and permitting bodily shifting of the bed frame in respect to the support to make room for the folded sections.

3. A bed of the character described comprising a frame attachable to a relatively fixed support, bars to rigidify the frame securable to another relatively fixed support, a bed frame composed of head and foot sections hinged together to permit folding upon themselves, mounting means carried by said supporting frame to which the head section is hinged permitting moving the folded bed frame toward the rear of an automobile into a substantially upright position, braces extending from the supporting frame to the bed frame, means upon the supporting frame and head section at which the ends of the braces are attached to sustain the bed frame when the sections are extended, and a leg carried by one of the bed frame sections to rest upon the ground and complete the support of the bed frame.

EDWARD VINCENT LOUSTALOT.